(12) United States Patent
Guering et al.

(10) Patent No.: US 8,262,020 B2
(45) Date of Patent: Sep. 11, 2012

(54) CASING AND FRONT LANDING GEAR ASSEMBLY FOR AN AIRCRAFT

(75) Inventors: Bernard Guering, Montrabe (FR); Jonathan Guering, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 792 days.

(21) Appl. No.: 12/336,988

(22) Filed: Dec. 17, 2008

(65) Prior Publication Data

US 2009/0159743 A1 Jun. 25, 2009

(30) Foreign Application Priority Data

Dec. 20, 2007 (FR) ..................................... 07 08944

(51) Int. Cl.
*B64C 25/58* (2006.01)
(52) U.S. Cl. ............. 244/102 R; 244/100 R; 244/129.4; 244/119
(58) Field of Classification Search ............... 244/100 R, 244/102 R, 129.4, 119
See application file for complete search history.

(56) References Cited

U.S. PATENT DOCUMENTS

| | | | | | |
|---|---|---|---|---|---|
| 5,482,228 | A | * | 1/1996 | Hoshino | 244/50 |
| 6,213,428 | B1 | * | 4/2001 | Chaumel et al. | 244/119 |
| 7,641,146 | B2 | * | 1/2010 | Wood et al. | 244/119 |
| 2008/0011901 | A1 | | 1/2008 | Guering | |
| 2008/0011905 | A1 | | 1/2008 | Guering | |
| 2008/0073463 | A1 | | 3/2008 | Guering | |
| 2008/0179457 | A1 | | 7/2008 | Guering | |
| 2008/0210813 | A1 | | 9/2008 | Guering et al. | |
| 2010/0032521 | A1 | * | 2/2010 | De Ruffray et al. | 244/102 A |

FOREIGN PATENT DOCUMENTS

| | | |
|---|---|---|
| EP | 0 980 822 A1 | 2/2000 |
| WO | WO 2007/057288 A1 | 5/2007 |
| WO | WO 2007/057400 A1 | 5/2007 |
| WO | WO 2009/004168 A2 | 1/2009 |
| WO | WO 2009/004200 A1 | 1/2009 |
| WO | WO 2009/004217 A1 | 1/2009 |
| WO | WO 2009/004218 A1 | 1/2009 |
| WO | WO 2009/004236 A1 | 1/2009 |

(Continued)

OTHER PUBLICATIONS

U.S. Appl. No. 12/599,377, filed Nov. 9, 2009, Guering, et al.

(Continued)

*Primary Examiner* — J. Woodrow Eldred
(74) *Attorney, Agent, or Firm* — Oblon, Spivak, McClelland, Maier, & Neustadt, L.L.P.

(57) ABSTRACT

A casing including a wall defining an internal housing which allows retraction of a corresponding landing gear into the interior of the housing. The wall separates the non-pressurized internal housing from a surrounding pressurized zone of the aircraft. The separation wall is a shell which envelops the shape of the landing gear, on the side opposite the opening of the internal housing, and the reinforcement structure includes on one hand longitudinal reinforcement elements extending on both sides of the shell and on the other hand transverse reinforcement elements connecting the longitudinal reinforcement elements. The shell has a first zone of considerable width accommodating the wheels of the landing gear, a second zone of lesser width accommodating the rod of the landing gear, and a third zone running from the second zone of lesser width, becoming wider and accommodating a portion of the mechanism for deployment/retraction of the landing gear.

20 Claims, 3 Drawing Sheets

FOREIGN PATENT DOCUMENTS

| | | |
|---|---|---|
| WO | WO 2009/007547 A2 | 1/2009 |
| WO | WO 2009/007548 A1 | 1/2009 |
| WO | WO 2009/007549 A2 | 1/2009 |
| WO | WO 2009/010648 A2 | 1/2009 |

OTHER PUBLICATIONS

U.S. Appl. No. 12/595,045, filed Oct. 8, 2009, Guering.
U.S. Appl. No. 12/597,990, filed Oct. 28, 2009, Guering.
U.S. Appl. No. 12/664,089, filed Dec. 11, 2009, Guering, et al.
U.S. Appl. No. 12/663,793, filed Dec. 9, 2009, Guering.
U.S. Appl. No. 12/664,473, filed Dec. 14, 2009, Guering, et al.
U.S. Appl. No. 12/664,411, filed Dec. 14, 2009, Guering, et al.
U.S. Appl. No. 12/664,408, filed Dec. 14, 2009, Guering, et al.
U.S. Appl. No. 12/664,281, filed Dec. 11, 2009, Guering, et al.
U.S. Appl. No. 12/373,055, filed Jan. 9, 2009, Guering.
U.S. Appl. No. 12/307,965, filed Jan. 8, 2009, Guering.

\* cited by examiner

US 8,262,020 B2

CASING AND FRONT LANDING GEAR ASSEMBLY FOR AN AIRCRAFT

BACKGROUND OF THE INVENTION

This invention relates to a storage casing for a front landing gear of an aircraft, as well as an assembly comprising such a casing and the corresponding front landing gear.

Usually, the front landing gear of an aircraft is housed, in retracted position, in a box, also referred to as casing, located in the front portion of the fuselage of the aircraft, generally underneath the floor of the cockpit of the aircraft and of a passenger cabin.

A landing gear casing has a wall forming the interface between the pressurized interior of the aircraft and the non-pressurized exterior of this aircraft. More often than not, the landing gear casing for a front landing gear is in the form of a more or less parallelepipedal unit, of general oblong shape, comprising several panels assembled with each other: an inclined upper panel, two longitudinal vertical side panels and two transverse vertical panels. An opening is provided on the side opposite the inclined upper panel in order to allow the lowering and raising of the front landing gear.

In order to make it possible for the various panels to withstand the pressure difference between the interior and the exterior of the aircraft, a plurality of transverse stiffening ribs are arranged parallel to each other and are fastened onto the outer surface of the landing gear casing so that each one forms a rigid frame. In such a structure, the panels withstand the forces due to the pressure while the rigid frames collect these forces in order to hold the panels in place.

Such a structure is effective for ensuring the functions of mechanical resistance to the pressure and for transmitting the forces exerted by the landing gear to the fuselage of the aircraft. The landing gear casing, however, occupies a substantial volume in the space where it is installed, leaving around it little space for accommodating other items of equipment, such as computers, for example, and allowing the running of electric cables.

The document FR-2 893 588 proposes a solution to restrict the volume of a front landing gear casing for an aircraft. The landing gear casing proposed in this document comprises a box structure on which fastening of a landing gear and take-up of the forces sustained by the landing gear are implemented. In an embodiment presented in this document, a round-shaped hood is intended to take up the pressurization forces at the landing gear casing.

The document WO 2007/057400 furthermore describes a reduced-volume landing gear casing comprising a chassis to ensure the fastening and the take-up of the landing gear forces and an envelope structure added to the chassis to take up the pressurization forces.

SUMMARY OF THE INVENTION

This invention has as its purpose to provide a front landing gear casing with an even more restricted volume. Preferably, this landing gear casing will allow the installation of systems or other items of equipment, such as computers, for example, around it. Advantageously, this structure will be simplified in relation to an existing structure of a front landing gear casing.

The invention also is intended to propose a casing and front landing gear assembly having a restricted volume and preferably allowing the installation of systems or other items of equipment.

To this end, this invention proposes a front landing gear casing for an aircraft comprising a wall defining an internal housing open on the bottom to allow the retraction of a corresponding front landing gear into the interior of the housing and its deployment outside the housing, the said wall separating the said non-pressurized internal housing from a surrounding pressurized zone of the aircraft and a reinforcement structure being provided around the wall on the side of the surrounding pressurized zone.

According to this invention, the separation wall is a shell coming to envelop the shape of the front landing gear, on the side opposite the opening of the internal housing, and the reinforcement structure comprises on the one hand longitudinal reinforcement elements extending on both sides of the shell and on the other hand transverse reinforcement elements connecting the longitudinal reinforcement elements.

The fact of using a shell rather than panels forming flat walls makes it possible to fit the shape of the landing gear. Furthermore, because of its form with preferably rounded sides, the shell better withstands the pressure forces due to the pressure difference prevailing on both sides of the wall.

In order to best fit the shape of the landing gear, in a first embodiment of the invention the shell has three zones:
- a first zone of considerable width, intended to accommodate the wheels of a landing gear,
- a second zone of lesser width, intended to accommodate a landing gear rod, and
- a third zone running from the second zone of lesser width, becoming wider and intended to accommodate a portion of a mechanism for deployment/retraction of a landing gear.

In this first embodiment, it may be provided that the longitudinal and transverse reinforcement elements define, above the second zone and the third zone, a more or less flat surface allowing it to serve as a support for a closet or similar facility.

In this first embodiment, it also may be provided that a hatch or a pair of hatches corresponds to each zone of the shell, the set of hatches making it possible to close off the internal housing of the landing gear casing. According to this embodiment variant, it is possible to reduce the surface area of the hatches of the aircraft and therefore also the mass of the moving components of the landing gear casing.

In a second embodiment, which may be combined with the first (and vice versa), the shell has two areas:
- a front area of considerable height intended to accommodate the wheels of a landing gear,
- a rear area of lesser height intended to accommodate a rod and a portion of a mechanism for deployment/retraction of the said landing gear and above which there extends at least one transverse reinforcement element making it possible to provide a support for an item of equipment of the aircraft.

This difference in height makes it possible to house items of equipment in the volume that the known prior casings occupied. The reinforcement element or elements provided above the rear area furthermore make it possible to install a floor for accommodating items of equipment.

When the two embodiments are combined, the front area advantageously corresponds to the first zone and the rear area corresponds to the second and third zones.

In a landing gear casing according to the invention, the shell advantageously is a molded shell made of a composite material. Such a shell is easy to produce. Moreover, because of the material used, a significant saving in mass may be achieved.

The longitudinal reinforcements of a landing gear casing according to the invention comprise, for example, flat lattices arranged vertically on both sides of the shell. Two side reinforcement boxes integrating a walking floor furthermore may be provided, each box extending longitudinally on both sides of the shell. By virtue of these boxes, the structure is reinforced and the floor provided allows access to electrical and electronic systems that come to find a place above the landing gear casing.

This invention also relates to an assembly comprising a landing gear casing such as described above and a front landing gear comprising wheels, a rod and a mechanism for deployment/retraction.

In the first embodiment described above, the shell of the landing gear casing has three zones:
 a first zone of considerable width, accommodating the wheels of the landing gear in retracted position,
 a second zone of lesser width, accommodating the rod of the landing gear in retracted position, and
 a third zone running from the second zone of lesser width, becoming wider and accommodating a portion of the mechanism for deployment/retraction of the landing gear in retracted position.

In the second embodiment described above, the shell of the landing gear casing comprises two areas:
 a front area of considerable height accommodating the wheels of the landing gear in retracted position,
 a rear area of lesser height accommodating the rod and a portion of the mechanism for deployment/retraction of the landing gear in retracted position, and above which there extends at least one transverse reinforcement element making it possible to provide a support for a piece of equipment of the aircraft.

Whatever the embodiment may be, it advantageously is provided that a towing point is arranged between the wheels of the landing gear, that a locking hook is arranged at the back of the first zone or of the front area of the shell, and that the locking hook cooperates with the towing point when the landing gear is in its retracted position. This embodiment makes it possible to optimize the internal volume of the landing gear casing and to reduce its overall space requirement.

Usually, the raising and lowering of the landing gear are controlled by a jack articulated between the rod of the landing gear and a support point. This invention proposes that the support point be a support point external to the landing gear casing, at the rear of the latter in relation to the corresponding direction of travel of the aircraft. This modification of the landing gear in relation to the landing gears of the prior art also makes it possible to optimize the volume of the landing gear casing.

Likewise, the landing gear generally comprises directional jacks making it possible to act on the wheels of the landing gear to make them pivot. This invention here proposes that the directional jacks be placed behind the rod of the landing gear in relation to the corresponding direction of travel of the aircraft.

Finally, this invention also relates to an aircraft, characterized in that it comprises a casing and front landing gear assembly such as described above.

BRIEF DESCRIPTION OF THE DRAWINGS

Other characteristics and advantages will come to light in the course of the description that follows, given solely by way of non-limitative example and presented with reference to the attached schematic drawings on which.

DETAILED DESCRIPTION OF THE INVENTION

Figure 1:
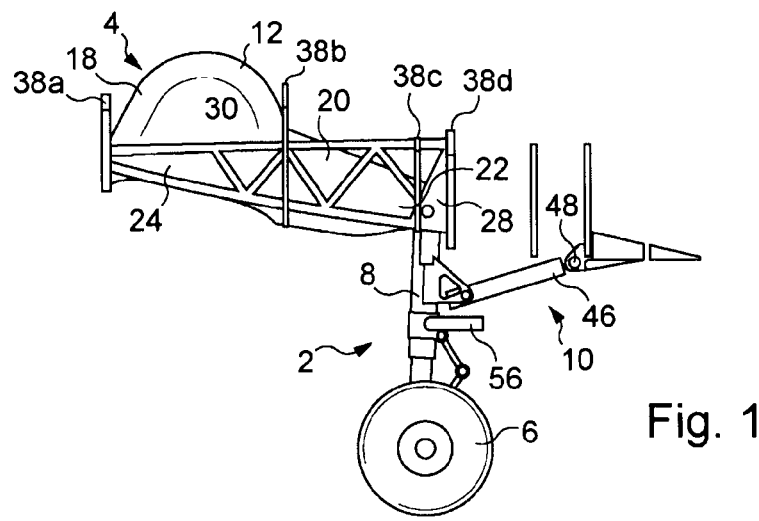
FIG. 1 is a side view of a front landing gear and its corresponding casing according to the invention.
Figure 2:
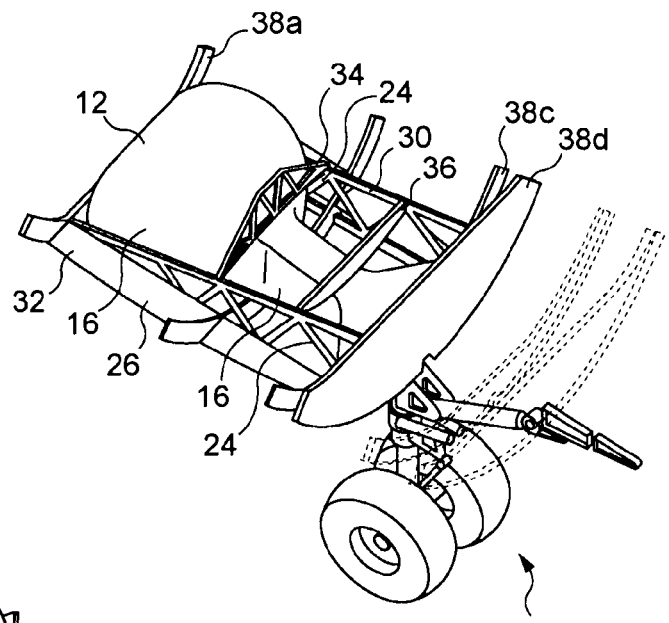
FIG. 2 is a perspective view of the casing and the landing gear of FIG. 1.

There is seen on FIG. 1 a front landing gear 2 of an aircraft as well as an associated landing gear casing 4.

The landing gear 2 comprises two wheels 6 mounted at the end of a rod 8. A mechanism for deployment/retraction 10 is associated with this landing gear 2. This mechanism has the purpose of raising and lowering this landing gear 2 into and from the landing gear casing 4.

As for the landing gear casing 4, it comprises a shell 12, longitudinal side reinforcements and transverse reinforcements.

The shell 12 is produced by molding from a synthetic material, preferably a carbon-based composite material. In fact, it is a matter of a half-shell inside of which the front landing gear 2 comes to be housed when it is in its retracted position. A large opening 14 (FIG. 3) allows the passage of the landing gear 2 when it is lowered and raised in the landing gear casing 4. The back of the shell 12, on the side opposite the opening 14, has an enveloping shape that comes to surround the landing gear 2 closely when this landing gear 2 is in its retracted position. Between the back of the shell 12 and the opening 14 of this shell, the shell 12 has flanks 16 that closely limit the passage of the landing gear 2 during a raising movement or a lowering movement.

The shell 12 has three main zones and two main areas. A first zone or front area 18 is a zone of considerable height and is intended to accommodate the wheels 6 of the landing gear 2. This first zone or front area 18 is arranged toward the front of the aircraft.

Behind this first zone or front area 18 is a second zone of lesser width as well as lesser height. This second zone 20 is intended to accommodate the rod 8 of the landing gear 2 when the latter is in its retracted position.

Finally, the third zone 22 of the shell 12 is the zone farthest to the back of this shell in relation to the aircraft. In a view from above, it has a triangular shape that runs widening toward the rear of the aircraft. This third zone 22 is intended to house a portion of the mechanism for deployment/retraction 10 associated with the landing gear 2.

The second and third zones 20 and 22 form a rear area the height of which is less than that of the front area 18.

The shell 12 forms a separation wall between the housing for the landing gear 2 and the interior of the aircraft. Whereas the housing for the landing gear 2 is not pressurized, the interior of the aircraft is. The shell 12 therefore must take up the pressure forces linked to the pressure difference prevailing between the exterior and the interior of an aircraft when the latter is in flight.

Significant forces also are exerted at the landing gear casing 4 during use of the landing gear 2. The side and transverse reinforcements mentioned above make it possible to help in the take-up of these forces being exerted at the landing gear 4.

The longitudinal reinforcement elements are composed on the one hand of two flat vertical lattices 24 and on the other hand of two side boxes 26.

The flat vertical lattices 24 are arranged longitudinally on both sides of the shell 12 and extend more or less over the entire length thereof. Each flat vertical lattice 24 has the shape of a right-angled triangle. The base 28 of this triangle extends more or less vertically to the rear. An edge 30, perpendicular to the base 28, extends toward the front of the aircraft. This edge 30 therefore is more or less horizontal and forms the upper edge of the flat vertical lattice 24. The two flat vertical lattices 24 are arranged symmetrically in relation to the shell 12.

The boxes 26 extend along the lower inclined edge of each flat vertical lattice 24. These boxes 26 are arranged on the corresponding side of the flat vertical lattice 24 opposite the shell 12. Each box 26 is delimited on one side by the corresponding flat vertical lattice 24, on another side by a portion of the fuselage of the aircraft and finally by a floor 32 forming the upper wall of the box 26.

The transverse reinforcement elements connect the flat vertical lattices 24. A first transverse reinforcement 34 is located more or less at the contact between the first zone 18 of the shell 12 and the second zone 20 of this shell. This first transverse reinforcement 34 is a rigid frame extending above the longitudinal flat vertical lattices 24.

As for a second transverse reinforcement 36, it is provided more or less at the joining between the second zone 20 of the shell 12 with the third zone 22 of this shell. This second transverse reinforcement 36 is located entirely between the flat vertical lattices 24. It is arranged between these flat vertical lattices 24 so as to form with the horizontal edges 30 thereof a more or less flat surface above the first and second zones 20 and 22. This flat surface advantageously serves as a support as illustrated on FIGS. 9 and 10.

Frameworks 38a, 38b, 38c and 38d of the general structure of the aircraft that also are involved in the reinforcement of the landing gear 4 also have been shown on the Figures. It is observed, in particular, that the front end of the flat vertical lattices 24 is connected by the framework 38a while the bases 28 forming the back ends of the flat vertical lattices 24 are connected by the framework 38d.

The new original form of a landing gear casing according to the invention makes it possible to reduce the surface area of the hatches of the landing gear casing. Whereas for a landing gear casing of the prior art there generally is provided a pair of hatches extending more or less over the entire length of the landing gear casing, this invention proposes using several hatches here. In the embodiment shown on FIGS. 4 to 7, it is observed that a hatch or a pair of hatches corresponds to each zone 18, 20, 22 of the shell 12. Thus, as emerges from these Figures, the opening 14 is partially closed off by the fuselage of the aircraft and by five traps.

A first pair of hatches 40 corresponds to the first zone 18 of the shell 12. This first pair of hatches 40 is provided in order to allow passage of the wheels 6.

As the second zone 20 of the shell 12 is of reduced width, only one hatch 42 is provided in this zone in order to allow passage of the rod 8 of the landing gear 2.

A second pair of hatches 44 is provided in the third zone 22 of the shell 12. This second pair of hatches 44 is open in order to allow activation of the mechanism for deployment/retraction 10 as well as to produce the necessary opening when the landing gear 2 is in its deployed position.

Figure 4:
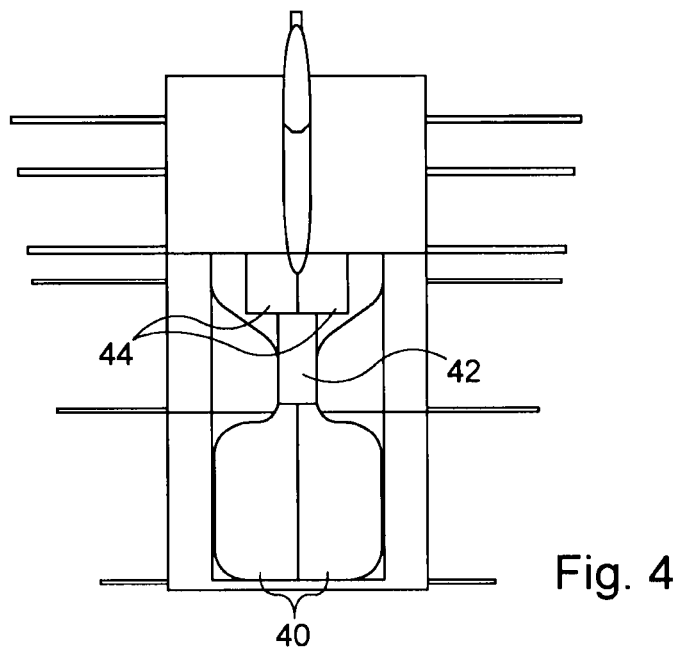
FIG. 4 is a view from below of a casing according to the invention, a front landing gear being housed inside this casing.
Figure 5:
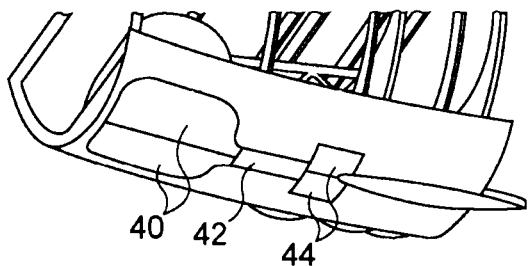
FIG. 5 is a perspective view showing the landing gear casing of FIG. 4 in a flight phase.
Figure 6:
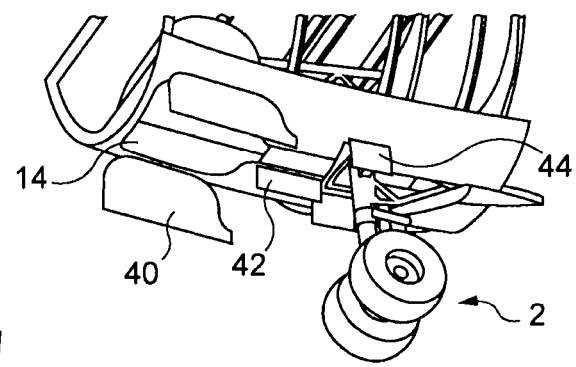
FIG. 6 is a view corresponding to FIG. 5 during a phase of raising or lowering of the front landing gear.
Figure 7:
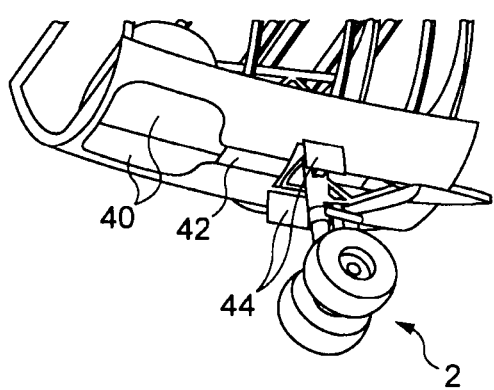
FIG. 7 is a view corresponding to FIGS. 5 and 6 during a landing phase and when the aircraft is on the ground.

FIG. 4 shows the different hatches in closed position. This corresponds, just as on FIG. 5, to an aircraft in flight. In order to lower or raise the landing gear 2, all the hatches open as illustrated on FIG. 6. When the landing gear 2 is fully lowered, the first pair of hatches 40 and the hatch 42 can close up, contributing to the aerodynamics of the aircraft.

The reduction of the surface area of the hatches makes it possible to reduce the masses to be activated. For this reason, the overall mass of the hatches and the mechanism for control of the hatches can be reduced, as can the cost of production of this assembly.

This invention also proposes a special embodiment of the landing gear 2, particularly well adapted to the landing gear casing 4 that has just been described.

As immediately emerges from the Figures, the raising and lowering of the landing gear 2 is accomplished with the aide of a jack 46 arranged between the rod 8 of the landing gear 2 and a support point 48 arranged on the outside of the landing gear casing 4. It actually is more usual for the activation jack to be mounted between the rod of a landing gear and a point located inside the corresponding landing gear casing. With the embodiment proposed and shown on the drawings, the landing gear 2 thus is pulled outside the landing gear casing 4 and pushed inside the latter. Generally, the reverse is true. This embodiment of the mechanism for deployment/retraction of the landing gear makes it possible to achieve a saving of space inside the landing gear casing 4, which is, of course, favorable for the overall saving of space sought by this invention.

Figure 3:
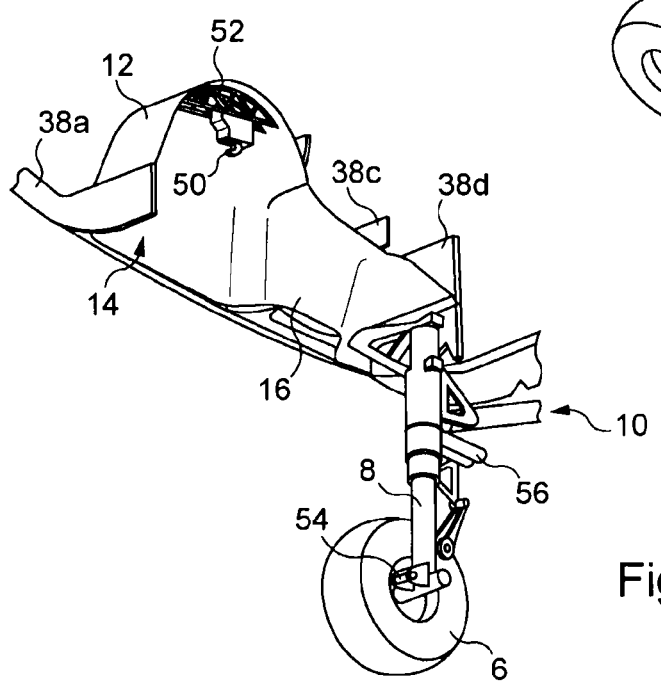
FIG. 3 is a perspective view, from a different angle and partially cut away, of the landing gear and the casing of FIGS. 1 and 2.

FIG. 3 illustrates a solution for locking of the front landing gear 2 in its retracted position which is favorable in terms of volume, mass and cost. In this embodiment shown on FIG. 3, a locking hook 50 is arranged in the back of the shell 12, in the first zone 18. This locking hook 50 is mounted on a reinforcement structure 52 that makes it possible to reinforce the first zone 18 of the shell 12. In fact, as this first zone has a significant surface area, it, more than the other zones, requires a reinforcement in order to withstand the pressure stresses.

As a rule, the front landing gear 2 comprises, between the wheels 6, a towing point 54. The locking hook 50 is arranged inside the shell 12 so that in retracted position of the landing gear 2, the towing point 54 comes to cooperate with the locking hook 50 in order to hold the landing gear 2 in locked position in the shell 12. This solution avoids the use of a locking strut generally used to lock a front landing gear in its landing gear casing.

In known manner, a front landing gear may be guided with the aid of directional jacks 56. The latter make it possible to position the wheels of the landing gear in order to guide the aircraft when the latter is set down on the ground. Such jacks generally are placed at the front of the rod of the front landing gear (considered in the direction of travel of the aircraft). It is proposed here to arrange these movement jacks 56 at the rear of the rod 8 of the landing gear 2. By arranging the directional jacks 56 in this way at the rear of the rod, and taking into account the direction of retraction of the landing gear 2 into its landing gear casing 4, the directional jacks 56 come to find a place in the retracted position inside the shell 12 between the flanks 16 of this shell. It is not necessary to provide a boss, or similar structure, in the back of the shell 12 for the housing of these directional jacks 56.

It may be observed that the positioning of the directional jacks 56 at the rear of the rod 8 of the landing gear also is favorable in terms of aerodynamic shape.

Figure 8:
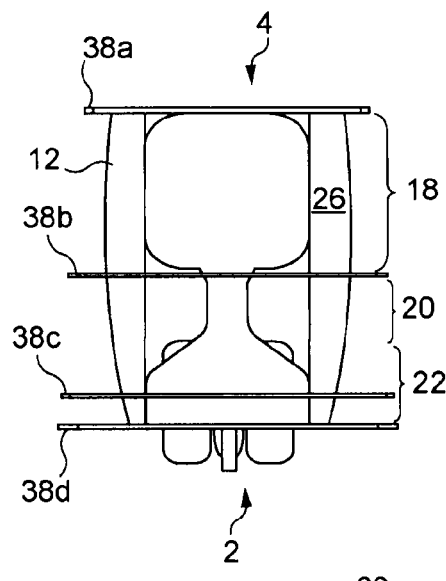
FIG. 8 is a view from above of a casing and a landing gear according to the invention.
Figure 9:
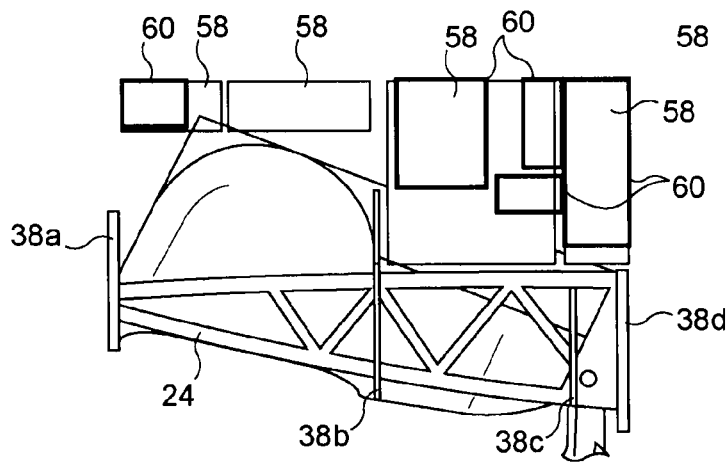
FIG. 9 is a side view of a landing gear casing according to the invention and of various system units arranged above this casing.

The various savings in space achieved by virtue of an entirely innovative design of the landing gear casing 4 make it possible to use to best advantage the space available in the aircraft around the front landing gear and its landing gear casing. FIGS. 8 and 9 show how systems housings 58 can come to find a place around the landing gear casing according to the invention. On these FIGS. 9 and 10, rectangles 60 illustrate the path of systems arranged above a landing gear casing for a standard prior-art structure of the landing gear casing. It is observed that the solution according to the invention makes it possible to install a considerably greater volume of systems housings 58 above the landing gear casing. The volume of these housings, in relation to the standard solution of the prior art, is more or less doubled.

Furthermore, the integration of the systems housings 58 is facilitated because the flat vertical lattices 24 and the second transverse reinforcement 36 are used to form a table accommodating these housings.

Figure 10:
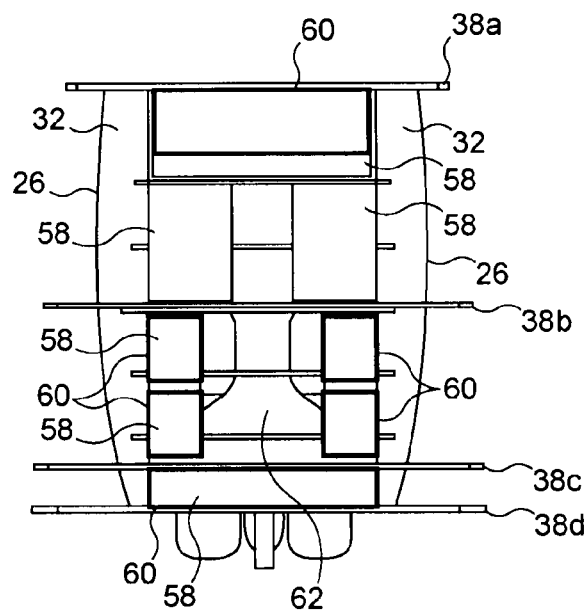
FIG. 10 is a view from above of the assembly shown on FIG. 9.

As can be seen in particular on FIG. 10, access to the systems housings 58 is permitted by virtue of the implementation of a central shaft 62 above the second zone 20 and the third zone 22 of the shell 12 and also by the presence of side b oxes 26 each provided with a floor 32.

The arrangement of the systems housings 58 shown on FIGS. 9 and 10 also makes it possible to easily implement the electrical connections and lines for these various housings.

In the proposed solution, the front landing gear casing comprises an integral shell closely surrounding the landing gear assembly while allowing pressure forces to be taken up, with the aid of mechanical reinforcement elements (longitudinal and transverse) simultaneously providing the function of take-up of localized landing gear forces and the function of accommodation table for electrical systems housings. The proposed solution makes it possible to have a reduced-volume front landing gear casing and to optimize the arrangement of the systems housings.

The primary structure of the landing gear casing is simplified in relation to a structure of the prior art. This structure may be made from synthetic materials, for example from carbon.

The proposed solution also has a reduced mass.

This invention was designed for aircraft intended most particularly for the transport of passengers, but of course it also may be applied to other types of aircraft such as, for example, aircraft for the transport of freight.

The landing gear casing described above may be made entirely with the aid of composite materials, in particular of carbon, but also may be made with the aid of more standard materials, that is, of metal.

This invention is not limited to the preferred embodiment described above by way of non-limitative example. It also relates to all the variant embodiments within the capacity of the individual skilled in the trade in the context of the claims below.

The invention claimed is:

1. A casing and front landing gear assembly for an aircraft, including a front landing gear casing and a front landing gear comprising wheels, a rod and a mechanism for deployment/retraction, the assembly comprising:
   the front landing gear casing comprises a wall defining an internal housing open on the bottom in order to allow retraction of the front landing gear into the interior of the housing and its deployment outside the housing, the wall separating the non-pressurized internal housing from a surrounding pressurized zone of the aircraft,
   a reinforcement structure is provided around the wall on the side of the surrounding pressurized zone,
   the separation wall is a shell coming to envelop the shape of the front landing gear, on the side opposite the opening of the internal housing,
   the reinforcement structure includes longitudinal reinforcement elements extending on both sides of the shell and transverse reinforcement elements connecting the longitudinal reinforcement elements,
   the shell has three zones:
   a first zone of considerable width, accommodating the wheels of the front landing gear in retracted position,
   a second zone of lesser width, accommodating the rod of the front landing gear in the retracted position, and
   a third zone running from the second zone of lesser width, becoming wider and accommodating a portion of the mechanism for deployment/retraction of the front landing gear in the retracted position.

2. The assembly according to claim 1, in which the longitudinal and transverse reinforcement elements define above the second zone and the third zone a more or less flat surface allowing it to serve as a support for a closet or similar facility.

3. The assembly according to claim 1, in which a hatch or a pair of hatches corresponds to each zone of the shell, the set of hatches making it possible to close off the internal housing of the front landing gear casing.

4. The assembly according to claim 1, in which the shell has two areas:
   a front area of considerable height accommodating the wheels of the landing gear, and
   a rear area of lesser height accommodating the rod and a portion of the mechanism for deployment/retraction of the front landing gear in retracted position and above which there extends at least one transverse reinforcement element making it possible to provide a support for an item of equipment of the aircraft.

5. The assembly according to claim 1, in which the shell is a molded shell made of a composite material.

6. The assembly according to claim 1, in which the longitudinal reinforcements comprise flat lattices arranged vertically on both sides of the shell.

7. The assembly according to claim 1, further comprising two side reinforcement boxes integrating a walking floor, each box extending longitudinally on both sides of the shell.

8. The assembly according to claim 1, in which:
   a towing point is arranged between the wheels of the front landing gear,
   a locking hook is arranged at the back of the first zone of the shell, and
   the locking hook cooperates with the towing point when the front landing gear is in its retracted position.

9. The assembly according to claim 1, in which:
   the raising and lowering of the front landing gear are controlled by a jack articulated between the rod of the front landing gear and a support point external to the front landing gear casing, at the rear of the latter in relation to the corresponding direction of travel of the aircraft,
   the front landing gear comprises directional jacks making it possible to act on the wheels of the front landing gear in order to make them pivot, and
   the directional jacks are placed behind the rod of the front landing gear in relation to the corresponding direction of travel of the aircraft.

10. A casing and front landing gear assembly for an aircraft, including a front landing gear casing and a front landing gear comprising wheels, a rod and a mechanism for deployment/retraction, the assembly comprising:

the front landing gear casing comprises a wall defining an internal housing open on the bottom in order to allow the retraction of a corresponding front landing gear into the interior of the housing and its deployment outside the housing, the wall separating the non-pressurized internal housing from a surrounding pressurized zone of the aircraft, a reinforcement structure is provided around the wall on the side of the surrounding pressurized zone, the separation wall is a shell coming to envelop the shape of the front landing gear, on the side opposite the opening of the internal housing, the reinforcement structure includes longitudinal reinforcement elements extending on both sides of the shell and transverse reinforcement elements connecting the longitudinal reinforcement elements, the shell has two areas:

a front area of considerable height accommodating the wheels of the front landing gear in retracted position, a rear area of lesser height accommodating the rod and a portion of the mechanism for deployment/retraction of the front landing gear in the retracted position, and above which there extends at least one transverse reinforcement element, making it possible to provide a support for an item of equipment of the aircraft.

11. The assembly according to claim 10, in which the shell has three zones:

a first zone have a width which accommodates, the wheels of the front landing gear in the retracted position, a second zone of lesser width than the width of the first zone, accommodating the rod of the front landing gear in the retracted position, and a third zone running from the second zone of lesser width, becoming wider and accommodating a portion of the mechanism for deployment/retraction of the front landing gear in the retracted position.

12. The assembly according to claim 11, in which a hatch or pair of hatches corresponds to each zone of the shell, the set of hatches making it possible to close off the internal housing of the front landing gear.

13. The assembly according to claim 10, in which the shell is a molded shell made of a composite material.

14. The assembly according to claim 10, in which the longitudinal reinforcements comprise flat lattices arranged vertically on both sides of the shell.

15. The assembly according to claim 10, which further comprises two side reinforcement boxes integrating a walking floor, each box extending longitudinally on both sides of the shell.

16. The assembly according to claim 10, in which:

a towing point is arranged between the wheels of the front landing gear, a locking hook is arranged at the back of the front area of the shell, and the locking hook cooperates with the towing point when the front landing gear is in its retracted position.

17. The assembly according to claim 10, in which:

the raising and lowering of the front landing gear are controlled by a jack articulated between the rod of the front landing gear and a support point external to the front landing gear casing, at the rear of the latter in relation to the corresponding direction of travel of the aircraft, the front landing gear comprises directional jacks making it possible to act on the wheels of the front landing gear in order to make them pivot, and the directional jacks are placed behind the rod of the front landing gear in relation to the corresponding direction of travel of the aircraft.

18. An aircraft comprising a casing and front landing gear assembly according to claim 1.

19. An aircraft comprising a casing and front landing gear assembly according to claim 10.

20. The assembly according to claim 10, in which the at least one transverse reinforcement element is located between the front area and the rear area.

* * * * *